(12) United States Patent
Kim et al.

(10) Patent No.: US 9,787,670 B2
(45) Date of Patent: Oct. 10, 2017

(54) APPARATUS AND METHOD FOR AUTHENTICATION BETWEEN DEVICES BASED ON PUF OVER MACHINE-TO-MACHINE COMMUNICATIONS

(75) Inventors: Dong Kyue Kim, Seoul (KR); Byong Deok Choi, Seoul (KR); Dong Hyun Kim, Yongin-si (KR); Sang Seon Park, Seongnam-si (KR); Kwang Hyun Jee, Guri-si (KR); Bong Jae Jin, Anyang-si (KR)

(73) Assignee: ICTK CO., LTD, Seoul (KR)

( * ) Notice: Subject to any disclaimer, the term of this patent is extended or adjusted under 35 U.S.C. 154(b) by 839 days.

(21) Appl. No.: 14/238,946

(22) PCT Filed: Aug. 16, 2012

(86) PCT No.: PCT/KR2012/006518
§ 371 (c)(1),
(2), (4) Date: Jun. 2, 2014

(87) PCT Pub. No.: WO2013/025060
PCT Pub. Date: Feb. 21, 2013

(65) Prior Publication Data
US 2014/0310515 A1 Oct. 16, 2014

(30) Foreign Application Priority Data

Aug. 16, 2011 (KR) .................. 10-2011-0081296
Aug. 16, 2012 (KR) .................. 10-2012-0089227

(51) Int. Cl.
*G06F 21/00* (2013.01)
*H04L 29/06* (2006.01)
(Continued)

(52) U.S. Cl.
CPC ............ *H04L 63/083* (2013.01); *G06F 21/34* (2013.01); *G06F 21/445* (2013.01); *G06F 21/72* (2013.01);
(Continued)

(58) Field of Classification Search
CPC ..... H04L 9/0866; H04L 9/321; H04L 9/3278; H04L 9/3226
See application file for complete search history.

(56) References Cited

U.S. PATENT DOCUMENTS 5,228,084 A 7/1993 Johnson et al.
5,818,738 A 10/1998 Effing
(Continued)

FOREIGN PATENT DOCUMENTS

CN 101006454 A 7/2007
CN 201638251 U 11/2010
(Continued)

OTHER PUBLICATIONS

Extended European Search Report dated Apr. 23, 2015 in European Patent Application No. 12824527.1. (9 pages).
(Continued)

*Primary Examiner* — Anthony Brown
*Assistant Examiner* — William Corum, Jr.
(74) *Attorney, Agent, or Firm* — Finnegan, Henderson, Farabow, Garrett & Dunner, L.L.P.

(57) ABSTRACT

Terminal devices that perform machine-to-machine (M2M) communication may autonomously perform password authentication by autonomously generating a personal identity number (PIN) value, which is not exposed externally, using a physical unclonable function (PUF). A terminal apparatus that performs M2M communication may include a PUF embedded in the terminal apparatus to generate an authentication key for password authentication associated (Continued)

with the terminal apparatus, and an authentication unit to perform the password authentication associated with the terminal apparatus using the authentication key generated by the PUF.

11 Claims, 8 Drawing Sheets

(51) Int. Cl.
| | | |
|---|---|---|
| H04L 9/32 | (2006.01) | |
| H04L 9/08 | (2006.01) | |
| G06F 21/34 | (2013.01) | |
| G06F 21/44 | (2013.01) | |
| G06F 21/72 | (2013.01) | |
| G06F 21/73 | (2013.01) | |
| G06F 21/85 | (2013.01) | |
| G09C 1/00 | (2006.01) | |
| H04W 4/00 | (2009.01) | |

(52) U.S. Cl.
CPC .............. *G06F 21/73* (2013.01); *G06F 21/85* (2013.01); *G09C 1/00* (2013.01); *H04L 9/0866* (2013.01); *H04L 9/321* (2013.01); *H04L 9/3226* (2013.01); *H04L 9/3278* (2013.01); *H04L 63/0876* (2013.01); *G06F 2221/2103* (2013.01); *G06F 2221/2107* (2013.01); *H04L 2209/12* (2013.01); *H04W 4/005* (2013.01)

(56) References Cited

U.S. PATENT DOCUMENTS

| | | | |
|---|---|---|---|
| 7,564,345 B2* | 7/2009 | Devadas et al. ............ 340/539.1 |
| 8,516,269 B1* | 8/2013 | Hamlet et al. ................ 713/189 |
| 2004/0025057 A1 | 2/2004 | Cook | |
| 2008/0256600 A1 | 10/2008 | Schrijen et al. | |
| 2008/0313467 A1 | 12/2008 | Lapstun et al. | |
| 2009/0083833 A1* | 3/2009 | Ziola et al. ........................ 726/2 |
| 2009/0204815 A1 | 8/2009 | Dennis et al. | |
| 2009/0282259 A1* | 11/2009 | Skoric et al. ................. 713/185 |
| 2010/0085075 A1* | 4/2010 | Luzzi et al. ...................... 326/8 |
| 2010/0127822 A1 | 5/2010 | Devadas | |
| 2010/0183154 A1 | 7/2010 | Graunke | |
| 2011/0002461 A1* | 1/2011 | Erhart et al. ..................... 380/44 |
| 2012/0131340 A1* | 5/2012 | Teuwen et al. ................ 713/168 |
| 2012/0290845 A1* | 11/2012 | Bares et al. ................... 713/170 |
| 2013/0010957 A1* | 1/2013 | Yu et al. ........................ 380/260 |
| 2013/0051552 A1* | 2/2013 | Handschuh et al. ............ 380/44 |
| 2013/0141137 A1* | 6/2013 | Krutzik et al. ..................... 326/8 |

FOREIGN PATENT DOCUMENTS

| | | |
|---|---|---|
| EP | 2 278 536 | 1/2011 |
| JP | H02501961 A | 6/1990 |
| JP | 2004-511082 | 4/2004 |
| JP | 2006-173485 | 6/2006 |
| JP | 2006-173485 | 6/2006 |
| JP | 2010-045768 | 2/2010 |
| KR | 10-1007739 B1 | 6/2010 |
| TW | 512617 | 12/2002 |
| TW | 200943897 | 10/2009 |
| WO | WO89/04022 | 5/1989 |
| WO | WO 01/73841 | 10/2001 |
| WO | WO 2008/056612 | 11/2007 |
| WO | WO 2009-092115 A2 | 7/2009 |
| WO | WO 2010060005 A2 | 5/2010 |

OTHER PUBLICATIONS

J. Guajardo et al., "Key Distribution for Wireless Sensor Networks and Physical Unclonable Functions," (11 pages).
P. Tuyls et al., "Strong Authentication with Physical Unclonable Functions." (16 pages).
J. Guajardo et al., "Anti-counterfeiting, key distribution, and key storage in an ambient world via physical unclonable functions," Inf Syst Front vol. 11, pp. 19-41 (23 pages), published on Oct. 23, 2008.
J. Guajardo et al., "Physical Unclonable Functions and Public Key Crypto for FPGA IP Protection." (7 pages).
P. Krzyzanowski, "Lectures on distributed systems Cryptographic communication and authentication," pp. 1-25 (25 pages).
Shin, Ju Seok et al., "A Study on the Mutual Authentication Protocol Utilizing PUF at Smart-Key of Automotive," Journal of thesis in KICS Conference (Winter season), Feb. 2011.
International Search Report mailed Jan. 29, 2013 in International Application No. PCT/KR2012/006518.
J. Guajardo et al., "Physical Unclonable Functions, FPGAs, and Public-Key Crypto for IP Protection," (8 pages).
Japanese Office Action issued Aug. 8, 2017 (corresponding to JP Patent Application No. 2014-525936).

\* cited by examiner

APPARATUS AND METHOD FOR AUTHENTICATION BETWEEN DEVICES BASED ON PUF OVER MACHINE-TO-MACHINE COMMUNICATIONS

FIELD OF THE INVENTION

The following description of one or more embodiments relates to a field of machine-to-machine (M2M) communication technology, and more particularly, to a method of performing secure authentication between devices for M2M communication.

DESCRIPTION OF THE RELATED ART

Machine-to-machine (M2M) communication is technology in which an embedded system or computer is equipped with a sensor capable of collecting information and a device capable of transferring information and thereby may autonomously collect and process information and make a decision and control itself.

Depending on the need, processed information only needs to be reported to a manager or a user and thus, participation of humans may be reduced. Accordingly, the M2M communication may be useful for work that may be dangerous for a human to handle, work taking a large amount of time, or fields in which a machine rather than a human may be more suitable due to security issues.

Although an information collecting system has been gradually automated with the development of a sensor, a function of processing collected information or making a direct decision based on the collected information has depended on a human for a long period of time.

With the advancement of a social system and technology, however, decision making without regard to a time or location has been needed and an amount of information to be processed has increased. In addition, information has been continuously updated and thus, constraints for a human to process information and make a decision have increased.

In this situation, an idea of M2M communication has been conceived to more usefully and efficiently use flooding data. The initial applications of the M2M communication in the year 1990 have been limited to a simple remote control, a wireless communication service for vehicle, and the like. A relevant market or industry has also been limited.

Recently, wired and wireless communication technology has been rapidly developing and an Internet system has been significantly expanded. In particular, due to introduction of new and inexpensive communication technology, such as radio frequency identification (RFID), near field communication (NFC), ZigBee, and Bluetooth, the cost of a system or apparatus for M2M communication has reduced.

Also, in a circumstance in which mobile telephone services which have been the center of the communication market, are reaching the limits in terms of market growth due to saturation of subscribers, the M2M communication industry has been identified as a new future market.

Meanwhile, a secure network environment may be needed for stable growth of the M2M communication industry. Accordingly, an authentication procedure for mutually verifying the identity between devices prior to establishing a communication path is needed. However, it may be difficult to apply a conventional security authentication method to the M2M communication as is. Accordingly, there is a need for a security authentication device and method suitable for the M2M communication.

When information processing or decision making is performed between devices in an environment in which human participation is absent, a security threat with malicious intent may become an obstacle in M2M communication technology.

A two authentication may be used for general security authentication. The two-factor authentication may perform both knowledge-based authentication and possession-based authentication. That is, the two-factor authentication may enhance security by performing authentication using two different schemes.

The knowledge-based authentication may include an authentication system based on a password or a personal identity number (PIN), and the possession-based authentication may include an authentication based on possessing a tangible or intangible object capable of identifying a user, such as an identification card.

For example, in the case of logging in a website, the knowledge-based authentication may perform password authentication only. However, in the case of performing financial transactions, the knowledge-based authentication using a password as well as the possession-based authentication using an official certificate, a security card, or a one-time password (OTP) may need to be performed.

As described above, depending on circumstances, possession-based authentication may be omitted. To this end, in many cases, knowledge-based authentication may necessarily be performed.

To achieve high security, an M2M communication may require the two-factor authentication. In such communication, a device, not a human, may need to autonomously perform the knowledge-based authentication.

To autonomously perform the knowledge-based authentication, the device may need to be capable of generating a password. In the related art, it was difficult for the device to autonomously generate a password.

Further, many M2M communication devices may be small and portable, and may be exposed to an outdoor environment. Therefore, a device may be physically extorted.

Accordingly, there is a need for a security authentication method that enables an M2M communication device to autonomously perform knowledge-based authentication and may also be safe against an external security attack, such as a bus probing attack, a memory scan attack, and a layout analysis attack.

SUMMARY

An aspect of one or more embodiments provides an apparatus and method that enables a device to autonomously generate a password and use the generated password for authentication through new technology called a physical unclonable function (PUF) in a machine-to-machine (M2M) communication field, thereby performing reliable security authentication for identifying devices mutually and verifying whether the devices are valid entities.

Another aspect of one or more embodiments also provides a security authentication device and method that is robust against a physical attack or an unauthorized access to a security authentication system of a device when secure communication using encryption and decryption is applied to systems or the device that performs M2M communication.

According to an aspect of one or more embodiments, there is provided a terminal device that performs machine-to-machine (M2M) communication, the terminal device including: a physical unclonable function (PUF) embedded in the terminal device to generate an authentication key for password authentication associated with the terminal device; and an authentication unit to perform the password authentication associated with the terminal device using the authentication key generated by the PUF.

The PUF may be physically isolated from an external environment to prevent the authentication key from being exposed to the outside.

According to another aspect of one or more embodiments, there is provided a terminal device that performs M2M communication, the terminal device including: a secret key module to provide a secret key for transferring, using a secret key encryption scheme, a public key used for communication of the terminal device using a public key encryption scheme; and a private key module to provide a private key for generating the public key. At least one of the secret key module and the private key module may include a PUF.

The terminal device may further include a fuse unit blocked in response to applying of overcurrent to block a path via which the secret key is extracted.

The fuse unit may block the path after the secret key is initially extracted from the terminal device.

The terminal device may further include: a serial number storage to store a serial number of the terminal device; and a fuse unit to block a path via which the secret key is extracted, after the serial number is stored in the serial number storage and the secret key is extracted.

The terminal device may further include a public key generator to generate the public key using the private key.

The terminal device may store a public key of an external device used for communication of the external device using the public key encryption scheme. When a message is received from the external device, the terminal device may decrypt the message using the public key of the external device.

When the message is decrypted, the terminal device may verify the validity of the external device depending on whether the identity of a serial number of the terminal device is acknowledged.

According to still another aspect, there is provided a CA device for managing a terminal device that performs M2M communication, the CA device including: a personal identity number (PIN) list to store a secret key of the terminal device and a serial number of the terminal device. When a message, in which a public key used for communication using a public key encryption scheme and the serial number of the terminal device are encrypted using the secret key, is transmitted from the terminal device, the CA device decrypts the message using the secret key. When the message is decrypted, the CA device may verify the validity of the external device depending on whether the identity of a serial number of the terminal device is acknowledged.

According to yet another aspect of one or more embodiments, there is provided a method of performing, by a terminal device, security authentication in order to perform M2M communication, the method including: generating, by the terminal device, a private key of the terminal device using a first PUF embedded in the terminal device; generating, by the terminal device, a public key for performing password authentication associated with the terminal device using the private key; and performing the password authentication with an external terminal other than the terminal device or an external CA using the public key.

The security authentication method may further include: generating a secret key for transferring the public key externally using a secret key encryption scheme, using a second PUF different from the first PUF; and exchanging the public key with the external CA based on a secret key encryption scheme using the secret key.

The security authentication method may further include: receiving, from the external CA, a message encrypted using a public key encryption scheme; decrypting the encrypted message using a pre-stored public key of the external CA; and completing security authentication with the external CA when a serial number of the terminal device is verified from the decrypted message.

The security authentication method may further include blocking a fuse present in a path via which the secret key is extracted, after a serial number of the terminal device is stored in a serial number storage and the secret key is initially extracted.

According to a further another aspect of one or more embodiments, there is provided a method of relaying, by a CA device, public key exchange for M2M communication between a first terminal device and a second terminal device, the method including: receiving, from the second terminal device, a request for a public key of the first terminal device; generating a first encryption message by encrypting the public key of the first terminal device and a serial number of the second terminal device using a private key of the CA device; and transmitting the first encryption message to the second terminal device.

The security authentication method may further include generating a second encryption message by encrypting a public key of the second terminal device and a serial number of the first terminal device using the private key of the CA device; and transmitting the second encryption message to the first terminal device.

The second terminal device may decrypt the first encryption message using a public key of the CA device corresponding to the private key of the CA device, and may trust the transmitted public key of the first terminal device when the serial number of the second terminal device is verified from the decrypted first encryption message.

The first terminal device may decrypt the second encryption message using a public key of the CA device corresponding to the private key of the CA device, and may trust the transmitted public key of the second terminal device when the serial number of to the first terminal device is verified from the decrypted second encryption message.

Effect of the Invention

According to embodiments, safe security authentication between devices or between a device and a system may be performed.

Accordingly, reliability of a process of mutually identifying between devices that perform machine-to-machine (M2M) communication and verifying whether the devices are valid entities may be guaranteed.

Also, conventional technologies using encryption and decryption may be applied to systems or a device that performs M2M communication.

DETAILED DESCRIPTION

Reference will now be made in detail to embodiments, examples of which are illustrated in the accompanying drawings, wherein like reference numerals refer to the like elements throughout. The exemplary embodiments described below illustrate one or more aspects of the present invention by referring to the figures.

Figure 1:
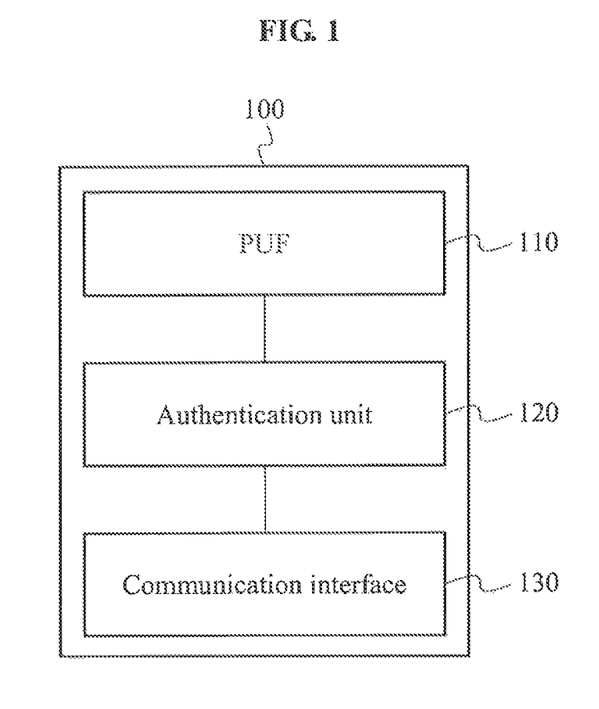
FIG. 1 is a block diagram illustrating a security authentication device according to an embodiment.

FIG. 1 is a block diagram illustrating a security authentication device 100 (hereinafter, also referred to as a device 100) according to an embodiment.

According to an embodiment, when performing machine-to-machine (M2M) communication between devices, the device 100 that performs M2M communication may autonomously generate and maintain a safe personal identify number (PIN) or a password and thereby perform knowledge-based authentication.

For the above knowledge-based authentication, a physical unclonable function (PUF) 110 that is robust against an external security attack and generates a random and unique PIN may be included in the device 100.

According to an embodiment, the PUF 110 may generate a PIN that may be used as an authentication key for the knowledge-based authentication. The PIN may be a random digital value that is generated by the PUF 110 due to process variation occurring during a manufacturing process.

Also, the PIN may be a time-invariant digital value that does not vary based on its surrounding environment once the value is generated. As such a PIN is not exposed to an external environment, it may be used to prevent a security threat with respect to an authentication system of the device 100.

When the device 100 performs M2M communication with another device (not shown) through a communication interface 130, an authentication unit 120 may receive the PIN that is autonomously generated by the PUF 110, and may perform knowledge-based authentication.

An exemplary configuration of the device 100 will be further described with reference to FIG. 2.

Figure 2:
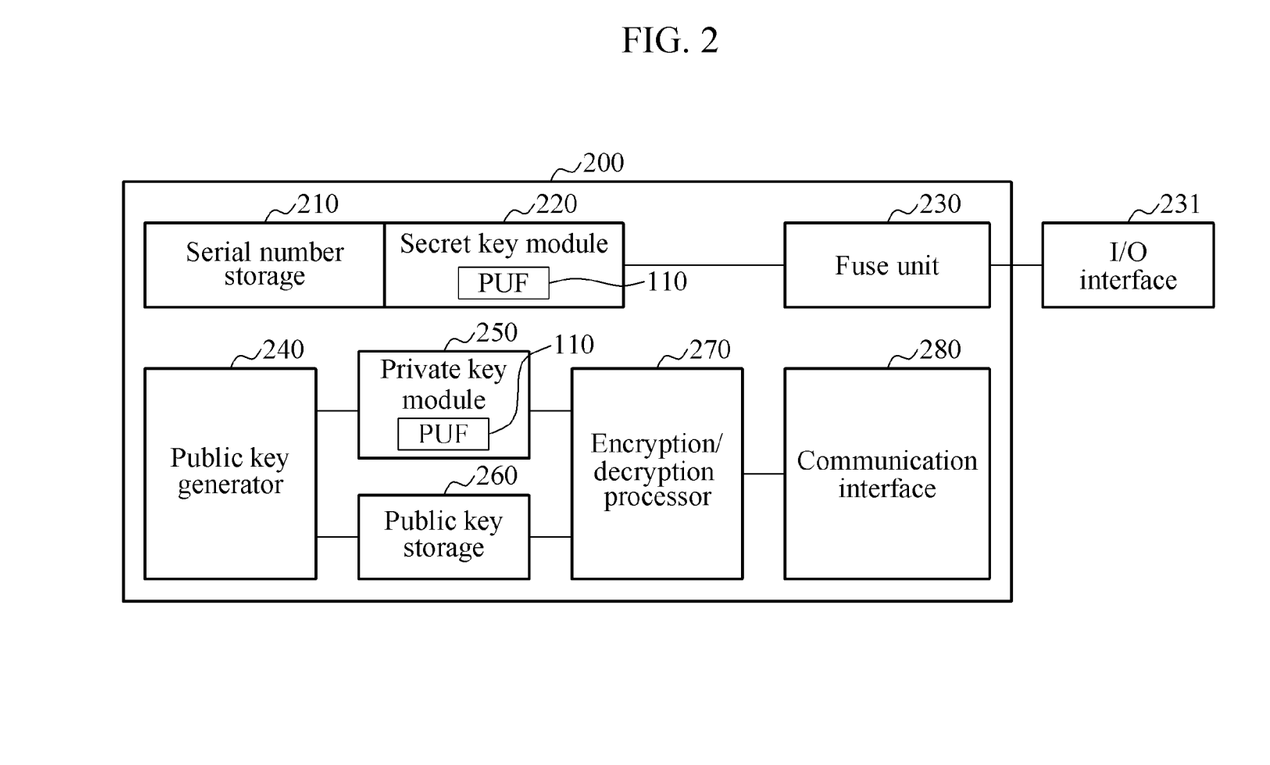
FIG. 2 is a block diagram illustrating a security authentication device according to another embodiment.

FIG. 2 is a block diagram illustrating a security authentication device 200 (hereinafter, also referred to as device 200) according to another embodiment.

In security authentication according to an embodiment, the device 200 may include a secret key module 220 and a private key module 250. Here, at least one of the secret key module 220 and the private key module 250 may include a PUF.

According to an embodiment, each of the secret key module 220 and the private key module 250 may include a unique PUF. Each PUF may have a secret key and a private key due to its physical properties. Hereinafter, a secret key and/or a private key may also be expressed as a PIN and, thus, the PIN may be understood to include the secret key, the private key, and the like, used for security authentication of the device 200.

A PUF may be a circuit that generates different function values using process variation even if it is manufactured based on an identical or equivalent design. According to some embodiments, the PUF may generate and provide a PIN of an M2M communication device. Specifically, instead of being a digital value that is generated using a physical property of the PUF, the PIN may be generated using the digital value.

For example, the PIN may be a value obtained as the result of encrypting an original digital value generated by the PUF with a seed value provided from a reliable external source.

During the above process, according to an embodiment, a method of inputting the seed and a digital value $V_{PUF}$ provided by the PUF into a hash function may be employed. Accordingly, a final PIN value may be Hash ($V_{PUF}$||Seed).

According to an embodiment, when a private key is exposed or leaked, a PIN may be changed by simply changing a seed value, improving safety and convenience.

Here, the above PIN value generation is only an example and thus, embodiments may include any case in which the digital value generated by the PUF is used as the PIN and any case in which another value obtained by processing the digital value is used as the PIN. Hereinafter, even though a process of generating a new PIN using the digital value generated by the PUF may not be described in detail, a description related to PIN value generation should be understood as including such embodiments.

Meanwhile, the PUF may have an unpredictable random value that may be used to determine a PIN of the device 200. Accordingly, the PUF may be used to prevent the PIN from being exposed when externally generating, inputting, and storing the PIN in a memory.

Also, since the PUF is physically impossible to duplicate, it may also be possible to reduce or eliminate the possibility of exposure or duplication of a PIN of the device 200.

Also, a PIN value generated by the PUF may have randomness, and according to embodiments, once the PIN value is generated, the PIN value may be time-invariant and reliable. An exemplary configuration of the PUF will be further described with reference to FIG. 3.

According to an embodiment, a unique value, for example, a serial number of the device 200 that is assigned from a factory during a manufacturing process of the device 200 may be stored in a serial number storage 210. The unique serial number of the device 200 may be input from the factory to the device 200 through an input/output (I/O) interface 231. In this case, a secret key may be extracted once from the secret key module 220 to the factory or an external source having a management right. The above extraction may be designated to be performed once for security reasons, even if not specified by a policy.

According to an embodiment, the device 200 may include a fuse unit 230. After the secret key is extracted once initially, the fuse unit 230 may physically block a connection between the secret key module 220 and the I/O interface 231. The blocking procedure may be irreversible.

Accordingly, an entity having the management right may safely maintain the secret key that is extracted once initially, and the secret key of the device 200 may not be extracted after blockage of the fuse unit 230. The secret key module 220 is configured by the PUF and thus, it may be physically impossible to duplicate. It may be difficult or even impossible to extract the secret key through a power analysis attack, a variety of reverse engineering, and the like.

According to an embodiment, the device 200 may include the private key module 250 to generate a private key used for a public key encryption/decryption communication scheme. The private key module 250 may provide a private key using a different PUF used in the secret key module 220.

The private key that is generated and provided by the private key module 250 may be physically isolated from an external environment, and may not be extracted to the outside while manufacturing, distributing, or using the device 200. For the same reason as described above with reference to the secret key module 220, it may be impossible to expose the private key through a physical attack.

Since exposure of the private key provided by the private key module 250 may to not occur, device authentication may be performed through a PIN that is autonomously generated by the device 200 in M2M communication.

According to an embodiment, using a private key generated by the private key module 250, a public key generator 240 may generate a public key to be used by the device 200 for the public key encryption/decryption communication scheme. The generated public key may be stored in a public key storage 260. The public key storage 260, as a means to store the generated public key, may be a non-volatile memory.

The public key storage 260 may be employed optionally. According to another embodiment, instead of using the public key storage 260, it may be possible to read a public key generated by the public key generator 240 every time authentication is required.

An encryption/decryption processor 270 may be understood as a crypto-coprocessor and the like that performs general data encryption and decryption. A communication interface 280 may be a configuration for substantially transmitting and receiving data to and from an outside in a network.

According to an embodiment, the once extracted secret key may be used as a means for verifying that the device 200 and a certification authority (CA) that is a management entity having the right to perform secure communication with the device 200, are valid entities, in order to exchange public keys between the device 200 and the CA.

That is, a secret key that is extracted once may be used during a process of transmitting the public key externally using a secret key encryption scheme, instead of being directly used for encryption and description of general messages. This may result in increased security and, accordingly, a private key used for actual device authentication may not be exposed to the outside.

Hereinafter, a process of manufacturing the device 200 in the factory, a process of circulating or distributing the device 200, a process of exchanging public keys using a secret key communication scheme in an actual use of the device 200, and a process in which the device 200 substantially verifies validity with the CA or other devices and thereby performs communication will be further described with reference to FIG. 3 through FIG. 8.

Figure 3:
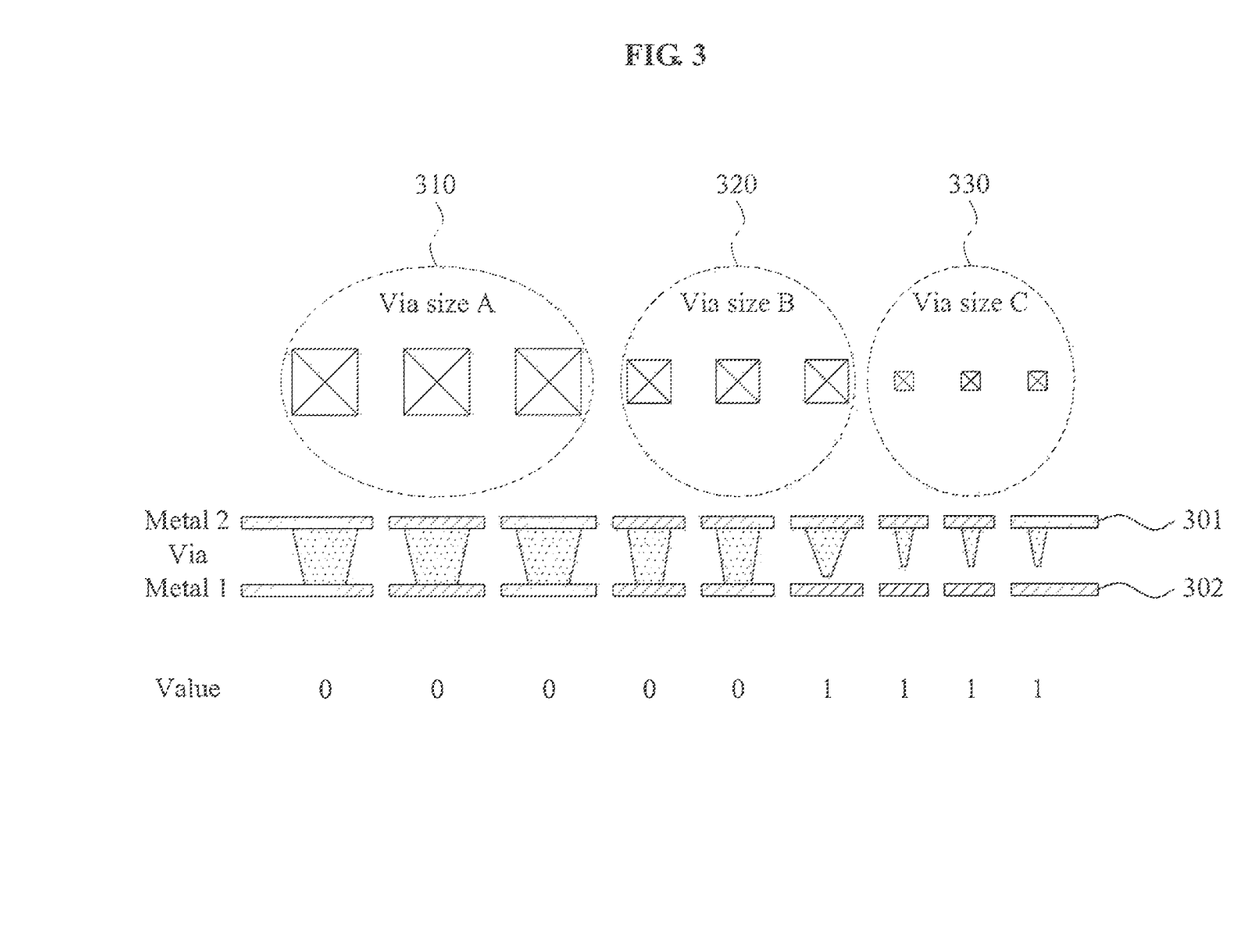
FIG. 3 is a diagram to describe an exemplary structure of a physical unclonable function (PUF) used to configure a secret key module or a private key module of FIG. 2 according to an embodiment.

FIG. 3 is a diagram describing an exemplary structure of a physical unclonable function (PUF) that may be used to configure a secret key module or a private key module of FIG. 2 according to an embodiment.

To this end, a difference between PUF configuration according to embodiments and PUF configuration according to the conventional art will be described and an example thereof will be described with reference to FIG. 3.

A PUF may provide a random digital value. Even though an exact manufacturing process is given and a plurality of PUFs may be manufactured through the same manufacturing process, each of the PUFs may provide a different digital value.

Accordingly, a PUF may be referred to as a physical one-way function (POWF) that is impossible to duplicate, and may also be referred to as a physical random function (PRF).

Such a PUF may be used to generate an encryption key for security and/or authentication. For example, the PUF may be used to provide a unique key to distinguish devices from one another.

To configure such a PUF conventionally, a coating PUF may be configured using particles randomly doped on a top layer of an integrated chip (IC). A recent butterfly PUF configurable even in a field-programmable gate array (FPGA) may be configured using process variation within a complementary metal-oxide semiconductor (CMOS) device generally used for a hardware chip such as a latch.

To increase the reliability of a PUF such that an application of using the PUF for PIN generation may be commercialized, a characteristic that a PUF circuit is physically impossible to duplicate, randomness of a generated PIN value, and a characteristic that the PIN value is time-invariant once the PIN value is generated, may need to be guaranteed.

However, many conventional PUF circuits may not, at a high level, guarantee at least one of the randomness and the time-invariance characteristics that may need to be satisfied as a PUF or a PRF, and thus, may have difficulty in being commercialized.

A PUF as described in the embodiments may overcome the conventional issues and may guarantee the time-invariance and the randomness at a reliable level, and may also be produced at low cost during a semiconductor manufacturing process.

According to an embodiment, to satisfy randomness and time-invariance of a PIN generated by a PUF, a random value may be generated using randomness that may occur based on short-circuiting between nodes present in a semiconductor process.

According to an embodiment of FIG. 3, a PUF may enable a short-circuiting to be randomly determined by configuring a size of a contact or a via, which may be used to electrically connect conductive layers (metal) within a semiconductor chip, to be a size smaller than the size provided in a design rule, that is, certain enough to be connected during the process. That is, a random PIN value may be generated by violating the design rule.

Since such new PUF circuit is configured as a simple short circuit, an additional circuit or process nor a particular measurement device are required. Accordingly, the new PUF circuit may be easily configured. Since a process characteristic is used, stability may be satisfied while maintaining randomness of a value.

Hereinafter, PUF generation according to an embodiment will be described with reference to FIG. 3.

Referring to FIG. 3, in a semiconductor manufacturing process, vias may be formed between a metal 1 layer 302 and a metal 2 layer 301.

In a group 310 in which a via size may be large based on a design rule, all of the vias may short the metal 1 layer 302 and the metal 2 layer 301. Whether the vias short the metal 1 layer 302 and the metal 2 layer 301 may be expressed as a digital value "0".

Meanwhile, in a group 330 in which a via size may be small, not all of the vias may short the metal 1 layer 302 and the metal 2 layer 301. Whether the vias short the metal 1 layer 302 and the metal 2 layer 301 may be expressed as a digital value "1".

In a group 320 in which a via size may be set to be between the via size of the group 310 and the via size of the group 330, a portion of vies may short the metal 1 layer 302 and the metal 2 layer 301 and the other portion of the vias may not short the metal 1 layer 302 and the metal 2 layer 301.

According to an embodiment, an identity key generator 210 may be configured by setting a portion of the vies to short the metal 1 layer 302 and the metal 2 layer 301 and by setting the other portion of vies to not short the metal 1 layer 302 and the metal 2 layer 301, as shown in the group 320.

A design rule about a via size may differ depending on a semiconductor manufacturing process. For example, when a design rule of a via may be set to be 0.25 micron in a CMOS process of 0.18 micron (urn), the identity key generator 210 may enable short-circuiting between metal layers to be probabilistically distributed by setting the via size to be 0.19 micron.

Ideally, the probability distribution regarding whether the via shorts the metal layers may be set to a probability of 50%. The secret key module 220 and the private key module 250 according to an embodiment may be configured by setting the via size to have the probability distribution as close to 50%. The above setting of the via size may be performed through a test according to a specific semiconductor process.

Through the aforementioned embodiment, the PUF may provide a secret key or a private key so that randomness and time-invariance may be guaranteed. Accordingly, tamper-resistance to cope with a physical attack may be unnecessary.

The tamper-resistance generally used for an encryption module in order to cope with a physical attack, such as a de-packaging attack, a lay-out analysis attack, and a memory attack, may protect the internal content by causing the device to malfunction through erasing the content of a memory and the like when an attempt to disassemble the device is made. However, an additional protecting device may be needed or a configuration means may be complex, which may result in increased cost and equipment damage due to user mistakes or a device malfunction. However, when configuring a PUF based on the principle described above with reference to FIG. 3, the above problems may not occur.

Also, it may be difficult according to an embodiment to separate and thereby observe each PUF cell within a chip. Therefore, it may be difficult to select only PUF cells within the chip, which may include ten to hundred thousands of gates, and observe only values of the selected cells.

Also, a portion of PUFs may have a valid value only when operating in a power-ON state. Therefore, when a chip is partially damaged during a de-packaging process for a physical attack and the like, the PUFs may have a value different from an original value and, thus, it may be difficult to estimate an original value.

Accordingly, when using a PDF according to an embodiment of the present invention, it is possible to provide a secret key and a private key having a configuration robust against a physical attack and maintaining randomness and time invariance without requiring additional cost such as tamper-resistance.

Figure 4:
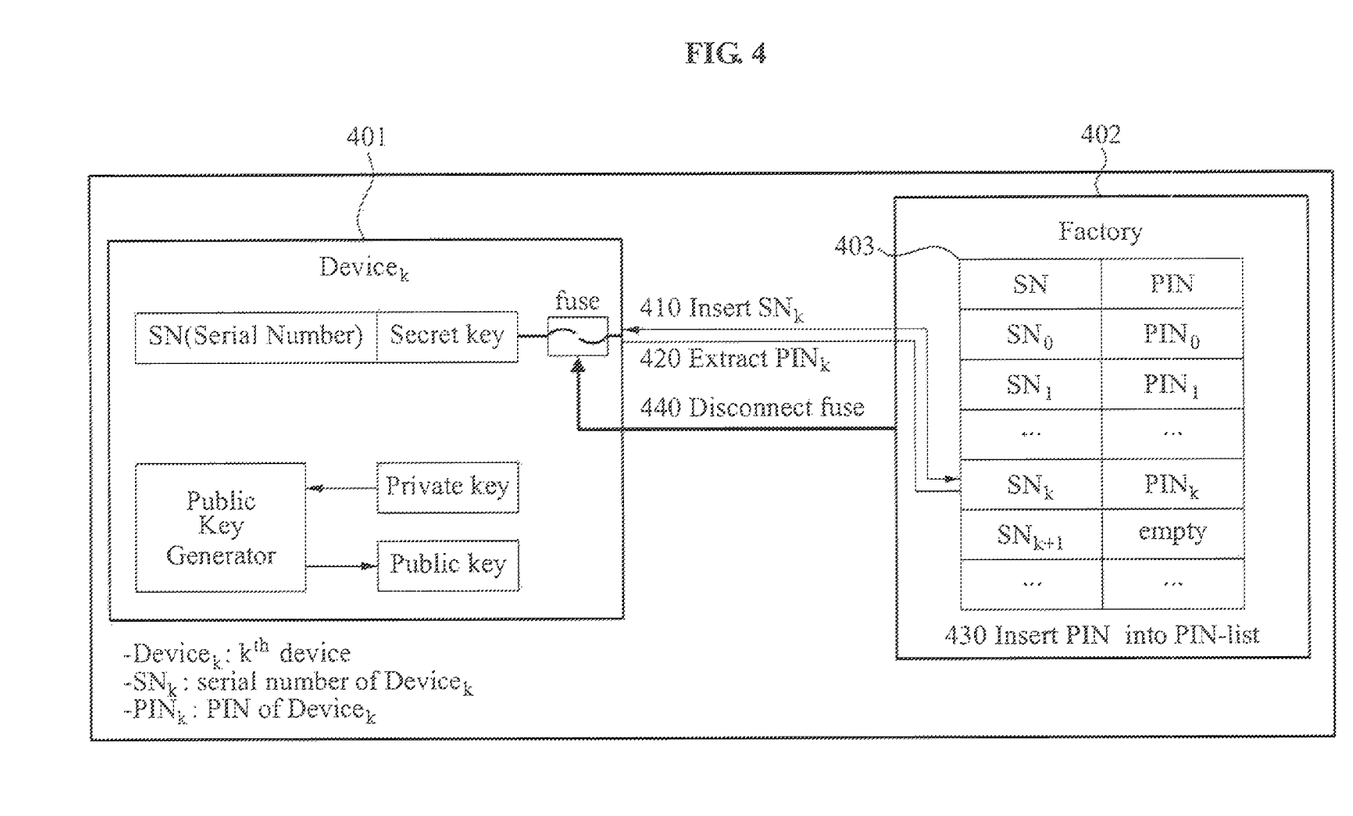
FIG. 4 is a diagram to describe a process of registering a serial number to a security authentication device, extracting a personal identity number (PIN), and registering the extracted PIN to a PIN list according to an embodiment.

FIG. 4 is a diagram describing a process of registering a serial number of a device 401, extracting a PIN that may be a secret key, and registering the extracted PIN to a PIN list 403 according to an embodiment.

During a process of manufacturing the device 401 in a, factory 402, registration of the serial number and extraction of a PIN value may be performed.

In operation 410, the factory 402 that may produce the device 401 may insert, into the device 401, a serial number (SN) that may be a unique ID.

In operation 420, the factory 402 may extract a PIN that may be a secret key of the device 401. In operation 430, the factory 402 may pair the SN and the PIN, and may store the paired SN and PIN in the PIN list 403. As described above, the PIN that may be the secret key of the device 401 may be a digital value that may be generated by a PUF that may be the secret key module 220 of FIG. 2. According to another embodiment, the PIN may be a value that may be generated by processing the digital value using a hash function and the like.

When content corresponding to the device 401 is stored in the PIN list 403, a path via which the PIN that is the secret key is extracted may be blocked in operation 440. According to an embodiment, during such process, a fuse may be disconnected by flowing overcurrent in an extraction circuit. Accordingly, as described above, the secret key may be extracted only once and it may become impossible to access or expose the PIN that is the secret key.

Hereinafter, each of elements used to describe security authentication in M2M communication will be described.

Individual devices, a server, and a CA may be included in a network model of the following M2M communication.

M2M communication devices, such as a terminal of an M2M communication, may collect information using a sensor, or may generate data and transmit the generated data to a server. Also, the M2M communication devices may transmit and receive data to and from a neighboring device in the same form.

A M2M communication server may collect and process data generated by devices in network, and may provide the processed data to a user as the base of an M2M communication service platform. A variety of applications may be executed by employing an open application platform interface (API) from a service platform. Each of the applications, which may operate for different purposes, may transmit and receive data to and from a device, and may process the data to be useful information, and provide the processed information to a user through a terminal such as a PC and a smart phone.

A CA may perform an authentication process for determining whether each device may be a valid entity. When communication between devices is to be performed, the CA may encrypt public keys of the devices using a private key of the CA and transmit the encrypted public keys so that the respective devices may trust or rely on the validity of a public key of a counter party device and use the public key.

Depending on cases, the CA and the server may be integrated. When the server may be integrated into the CA, the integrated CA may authenticate each of the devices. Hereinafter, for ease of description, the server is not particularly illustrated and only the CA will be illustrated and described by assuming that the server is integrated into the CA.

When performing a security authentication method according to embodiments, a protocol may require that an operation of collecting information, for example, a PIN and a public key of M2M communication devices, to be initially performed for authentication. The collected information may be used as reference information to determine the validity of each device in an M2M communication network.

The process of performing the security authentication method according to embodiments may include four operations, 1) an operation of inserting a serial number (SN) into each of individual devices, extracting a PIN, and generating a PIN list, 2) an operation of registering the PIN list to a CA, 3) an operation of exchanging and thereby registering a public key between a device and the CA, and 4) an operation of authenticating the PIN for mutual authentication prior to initiating communication.

The above "1" is described above with reference to FIG. 4, the above "2" will be described later with reference to FIG. 5, the above "3" will be described later with reference to FIG. 6, and the above "4" will be described with reference to FIG. 7.

Figure 5:
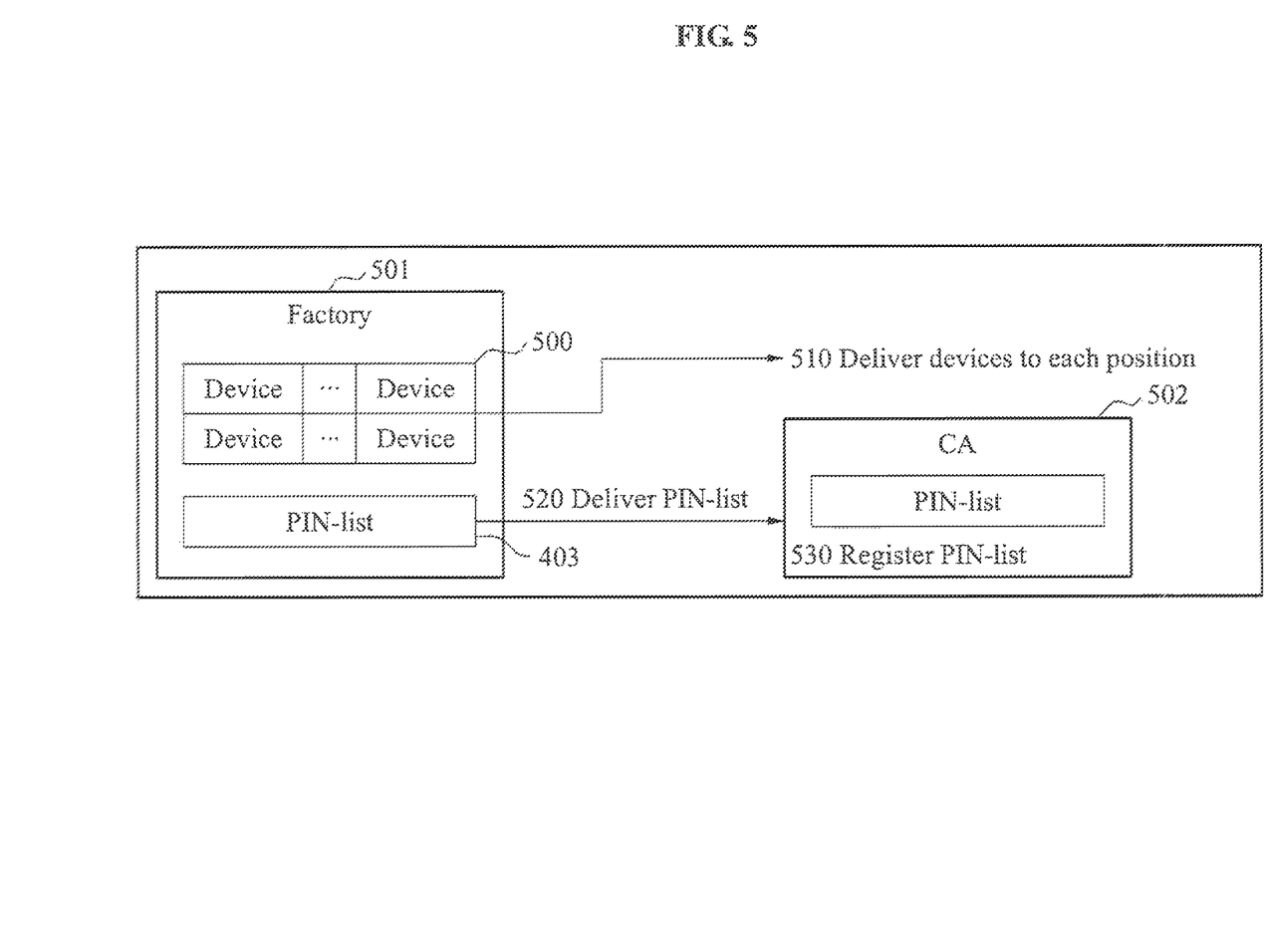
FIG. 5 is a diagram to describe a process of distributing security authentication devices from a factory and transferring and thereby registering a PIN list to a certification authority (CA) according to an embodiment.

FIG. 5 is a diagram illustrating a process of distributing security authentication devices 500 from a factory 501 and transferring and thereby registering a PIN list 403 to a CA 502 according to an embodiment.

In operation 510, each of the devices 500 may be distributed to a position to be used. The above distribution process may indicate a general process about sales or circulation after manufacturing of the devices 500.

In operation 520, the PIN list 403 may be delivered to the CA 502 through a safe offline path.

In operation 530, the delivered PIN list 403 may be registered.

Figure 6:
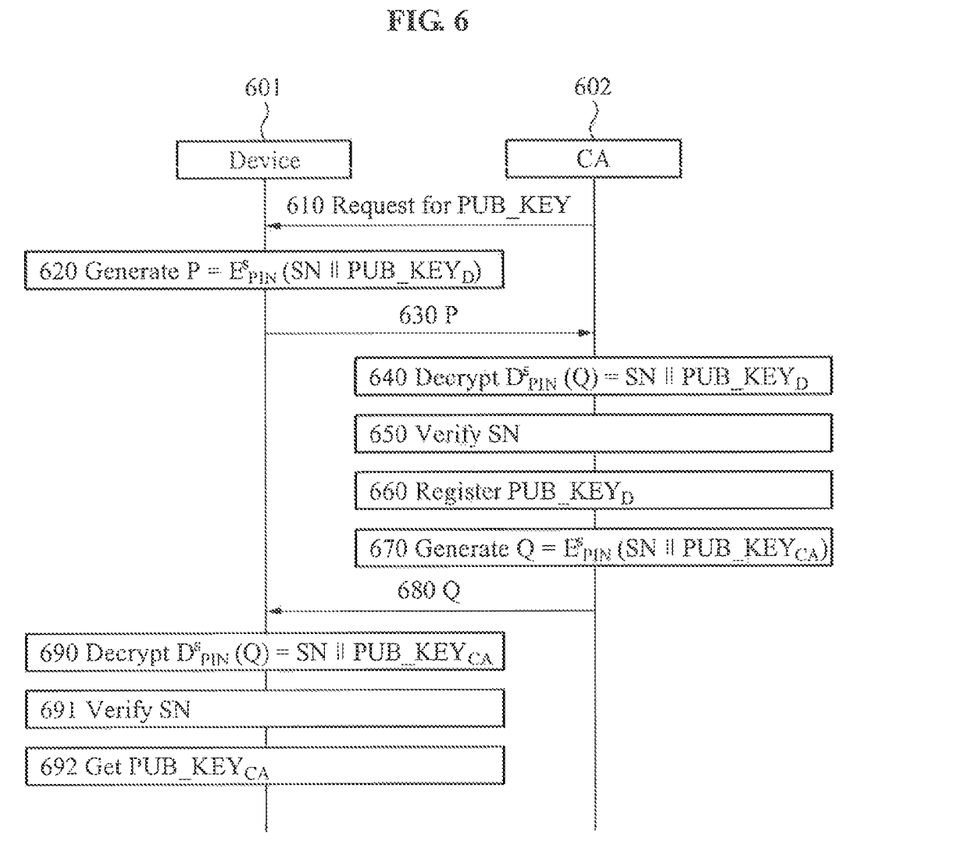
FIG. 6 is a flowchart illustrating a process of registering public keys between a device and a CA according to an embodiment.

FIG. 6 is a flowchart illustrating a process of registering public keys between a device 601 and a CA 602 according to an embodiment.

In operation 610, the CA 602 may transmit, to the device 601, a message that may make a request for a public key.

In operation 620, the device 601 may generate a message P by encrypting a serial number (SN) and a public key of the device 601 using a PIN that may be a secret key of the device 601.

In operation 630, the device 601 may transmit the message P to the CA 602. That is, the device 601 may transmit the public key of the device 601 to the CA 602 using a secret key encryption algorithm.

When the CA 602 receives the message P and decrypts the message P using the PIN that may be the secret key of the device 601 in operation 640, $PUB\_KEY_D$ that may be the public key of the device 601 may be obtained.

Here, in operation 650, the CA 602 may compare the decrypted SN with the SN of the device 601 of which authentication may be ongoing.

When the decrypted SN is verified to be identical to the SN of the device 601, the validity of the device 601 may be verified. In operation 660, the CA 602 may register $PUB\_KEY_D$ that may be the public key of the device 601 to a PIN list of the CA 602.

In operation 670, the CA 602 may generate a message Q by encrypting the SN and $PUB\_KEY_{CA}$ that may be a public key of the CA 602 using the secret key PIN of the device 601. In operation 680, the CA 602 may transfer the generated message Q to the device 601.

In operation 690, the device 601 may obtain the SN and $PUB\_KEY_{CA}$ by decrypting the message Q using a secret key algorithm.

In operation 691, the device 601 may verify the validity by checking the identity of the SN. When the identity of the SN is verified, the device 601 may store the public key $PUB\_KEY_{CA}$ of the CA 602 in a non-volatile memory of the device 601 in operation 692.

When public keys are mutually exchanged between the device 601 and the CA 602 through the above process, data communication may be performed using each public key of counter parties.

Figure 7:
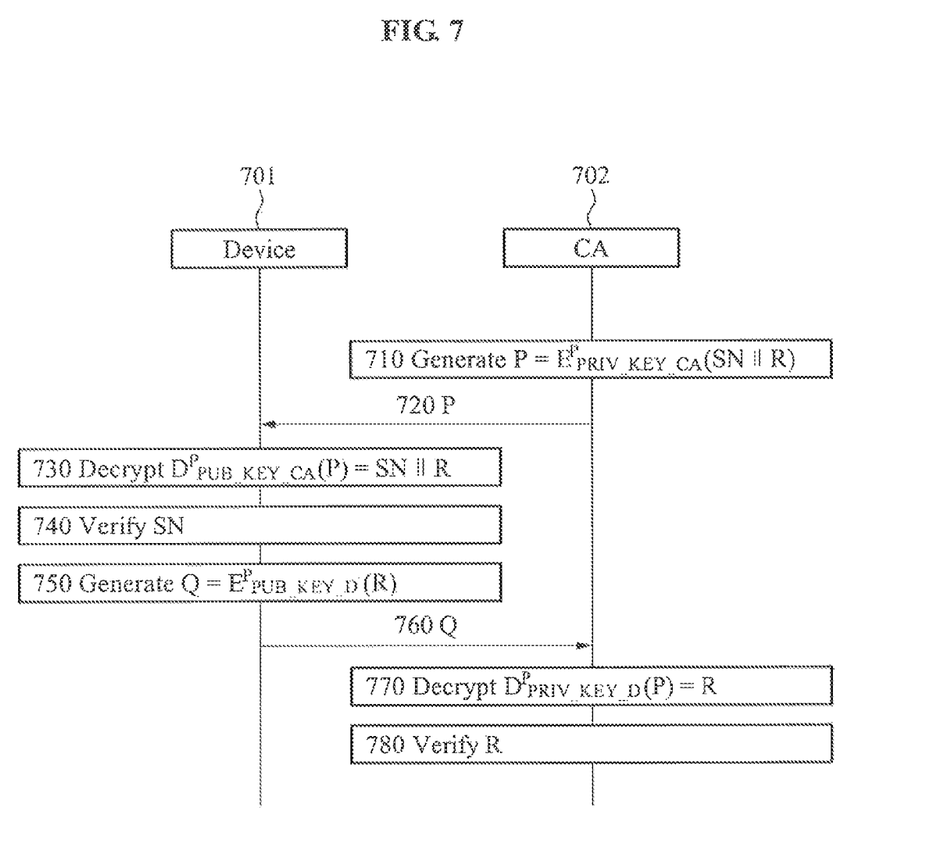
FIG. 7 is a flowchart illustrating a process of verifying validity of a device according to an embodiment.

Referring to FIG. 7, the validity between a device 701 and a CA 702 may be verified prior to initiating mutual communication.

Two cases may be present to perform an authentication process for verifying validity. One may be a case in which a server may be identical to a CA and the CA directly communicates with a device. The other one may be a case in which a server may be different from a CA, or an individual device and another individual device communicate with each other. The first case will be described with reference to FIG. 7 and the second case will be described with reference to FIG. 8.

FIG. 7 is a flowchart illustrating a process of verifying the validity of the device 701 according to an embodiment.

In operation 710, the CA 702 may generate a message P by encrypting a serial number (SN) of the device 701 and a nonce R that may be a random number for authentication, using $PRIV\_KEY_{CA}$ that may be a private key of the CA 702.

When the message P is transmitted to the device 701 in operation 720, the device 701 may decrypt the message P using $PUB\_KEY_{CA}$ that may be a public key of the CA 702 in operation 730.

Accordingly, the SN and the nonce R may be obtained. When the validity is verified by comparing the identity of the SN in operation 740, the device 701 may encrypt the nonce R again using $PRIV\_KEY_D$ that may be a private key of the device 701 in operation 750.

The encrypted message Q may be transmitted to the CA 702 in operation 760, and the CA 702 may decrypt the nonce R using the public key $PUB\_KEY_D$ of the device 701 in operation 770. When the nonce R is verified in operation 780, the validity enabling communication between the device 701 and the CA 702 may be verified. Accordingly, the device 701 and the CA 702 may communicate with each other by transmitting and receiving data using the public key encryption/decryption scheme.

The first case in which a server may be identical to a CA and the CA communicates with a device is described above. Hereinafter, the second case in which a server may be different from a CA, or an individual device and another individual device communicate with each other, will be described with reference to FIG. 8.

Figure 8:
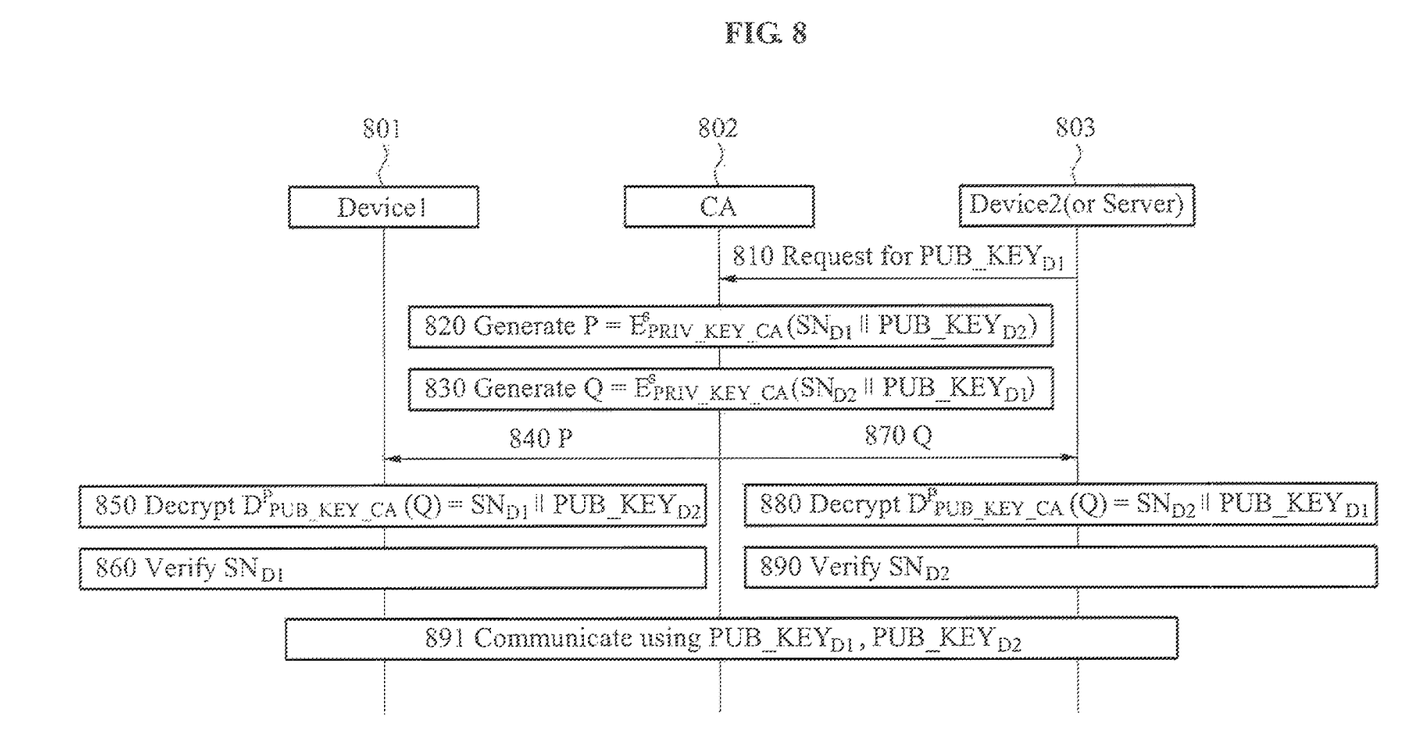
FIG. 8 is a flowchart illustrating a process of exchanging public keys between devices through a CA in order to perform security authentication between devices excluding the CA, according to an embodiment.

Here, the device desiring to communicate with the server or another device needs to receive a public key of the device. Excluding a configuration in which the CA may act as a mediator during a public key exchanging process, the second case may be similar to the first case.

That is, only the CA may maintain each PIN that may be a secret key of the individual devices and may verify the validity with respect to each of the individual devices by exchanging public keys. Since a secret key may not be maintained between devices or between a device and the server, the CA may serve as a mediator during a process of verifying whether a corresponding device may be a target for exchanging a public key or a process of exchanging public keys. The above process will be described with reference to FIG. 8.

FIG. 8 is a flowchart illustrating a process of exchanging a public key between devices, for example, a first device 801 and a second device 803 through a CA 802 in order to perform security authentication between the devices (excluding the CA 802), according to an embodiment.

Here, it may be assumed that the second device 803 may desire to exchange public keys with the first device 801 to perform communication with the first device 801.

In operation 810, the second device 803 may request the CA 802 for $PUB\_KEY_{D1}$ that may be a public key of the first device 801.

In operation 820, the CA 802 may generate a message P by encrypting $PUB\_KEY_{D2}$ that may be a public key of the second device 803 and $SN_{D1}$ that may be a serial number (SN) of the first device 801 using $PRIV\_KEY_{CA}$ that may be a private key of the CA 802.

In operation 830, the CA 802 may generate a message by encrypting public key $PUB\_KEY_{D1}$ of the first device 801 and $SN_{D2}$ that may be an SN of the second device 803 using the private key $PRIV\_KEY_{CA}$ of the CA 802.

When the CA 802 transfers the message P to the first device 801 in operation 840 the first device 801 may obtain $SN_{D1}$ and the public key $PUB\_KEY_{D2}$ of the second device 803 by decrypting the message P using the public key $PUB\_KEY_{CA}$ of the CA 802 in operation 850.

When the validity is verified through comparing the identity of $SN_{D1}$ in operation 860, the first device 801 may store the public key $PUB\_KEY_{D2}$ of the second device 803 and use the same to encrypt a message to be transmitted to the second device 803.

When the CA 802 transfers the message Q to the second device 803 in operation 870, the second device 803 may obtain $SN_{D2}$ and the public key $PUB\_KEY_{D1}$ of the first device 801 by decrypting the message Q using the public key $PUB\_KEY_{VA}$ of the CA 802 in operation 880.

When the validity is verified through comparing the identity of $SN_{D2}$ in operation 890, the second device 803 may store the public key $PUB\_KEY_{D1}$ of the first device 801 and use the same to encrypt a message to be transmitted to the first device 801.

When public keys are mutually exchanged between the first device 801 and the second device 803, the first device 801 and the second device 803 may directly communicate with each other by encrypting a message to be transmitted to counter parties using public keys of the counter parties, which may be the same as the aforementioned communication between the CA and the device.

Even in a case in which a CA and a server may differ and a device may communicate with the server, the process may be the same except for a configuration in which the second device 803 may be the server.

According to the embodiments, requirements, such as impossibility of exposure, impossibility of duplication, and uniqueness, may be satisfied by applying a PUF-based secret key PIN to a knowledge-based authentication scheme.

According to the embodiments, reliability of security authentication may be guaranteed in M2M communication, for example, in a variety of applications such as an application using an REID, a smart grid application, a cloud computing application, and the like. Nevertheless, the cost for guaranteeing the reliability may be inexpensive.

The above-described exemplary embodiments may be recorded in computer-readable media as a form of program instructions operated by various types of computers. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions may include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A terminal device that performs machine-to-machine (M2M) communication, the terminal device comprising:
   a secret key module to provide a secret key for transferring a public key, using a secret key encryption scheme, the public key being used for communication of the terminal device using a public key encryption scheme;
   a private key module to provide a private key for generating the public key, wherein at least one of the secret key module and the private key
   module includes a physical unclonable function (PUF); and a fuse unit configured to block a path via which the secret key is
   extracted, wherein the PUF includes at least one via disposed between two metal layers, the via having a first size smaller than a second size specified by a design rule.

2. The terminal device of claim 1, wherein the fuse unit blocks the path after the secret key is initially extracted from the terminal device.

3. The terminal device of claim 1, further comprising:
   a serial number storage to store a serial number of the terminal device, wherein the fuse unit is configured to block a path via which the secret key is extracted, after the serial number is stored in the serial number storage and the secret key is extracted.

4. The terminal device of claim 1, further comprising: a public key generator to generate the public key using the private key.

5. The terminal device of claim 1, wherein:
   the terminal device stores a public key of an external device used for communication of the external device using the public key encryption scheme, and
   when a message is received from the external device, the terminal device decrypts the message using the public key of the external device.

6. The terminal device of claim 5, wherein when the message is decrypted, the terminal device verifies the validity of the external device depending on whether the identity of a serial number of the terminal device is acknowledged.

7. A method of performing, by a terminal device, security authentication in order to perform machine-to-machine (M2M) communication, the method comprising:
   generating, by the terminal device, a private key of the terminal device using a first physical unclonable function (PUF) embedded in the terminal device;

generating, by the terminal device, a public key for performing password authentication using the private key;

generating a secret key for transferring the public key externally using a secret key encryption scheme;

blocking a path via which the secret key is extracted, using a fuse; and performing the password authentication with an external terminal other than the terminal device or an external certification authority (CA) using the public key, wherein the first PUF includes at least one via disposed between two metal layers, the via having a first size smaller than a second size specified by a design rule.

8. The method of claim 7, further comprising:

generating the secret key using a second PUF different from the first PUF; and exchanging the public key with the external CA based on a secret key encryption scheme using the secret key.

9. The method of claim 7, further comprising:

receiving, from the external CA, a message encrypted using a public key encryption scheme;

decrypting the encrypted message using a pre-stored public key of the external CA; and completing security authentication with the external CA when a serial number of the terminal device is verified from the decrypted message.

10. The method of claim 8, further comprising: blocking the fuse after a serial number of the terminal device is stored in a serial number storage and the secret key is initially extracted.

11. The terminal device of claim 1, wherein the secret key module includes a first physical unclonable function (PUF), and the private key module includes a second PUF different from the first PUF.

* * * * *